Patented Aug. 26, 1941

2,253,567

UNITED STATES PATENT OFFICE 2,253,567

COOKING DEVICE

William L. Kochenour and Harry W. Wineka, York, Pa.

Application August 10, 1939, Serial No. 289,390

4 Claims. (Cl. 53—7)

This invention relates to cooking devices and more particularly to machines especially adapted for automatically cooking nuts and nut meats.

An object of the invention is to provide an improved device for receiving raw nuts and nut meats or other food articles and conveying them through a cooking cycle.

Another object of the invention is to provide a cooking device having improved means for conveying the food articles through a circuit.

Another object of the invention is to provide improved means for delivering the articles to be cooked to a circuit.

Another object of the invention is to provide improved means for changing the distance traveled by the articles in the cooking material, without changing the length of mechanical conveyers employed.

Another object of the invention is to provide improved means for automatically discharging the cooked food from the device.

Another object of the invention is to provide an improved cooking device of the above type in which the mechanism includes a container for grease, oil or other material within which the food is to be cooked, a plurality of baskets mounted for submersion within the material and so operated as to remain for sufficient length of time within the material so that the food will be properly cooked, means for automatically loading the baskets with a predetermined quantity of the food to be cooked, and means for automatically operating the baskets to discharge the cooked food therefrom.

With the foregoing and other objects in view, as will more fully appear as the description proceeds, the accompanying drawings illustrate a preferred embodiment of the invention, though it is to be understood that we do not wish to be limited to the precise details of construction shown therein, for the same may be modified in different aspects so far as details of construction are concerned, within the spirit of the following disclosure and the scope of the annexed claims.

Figure 1:
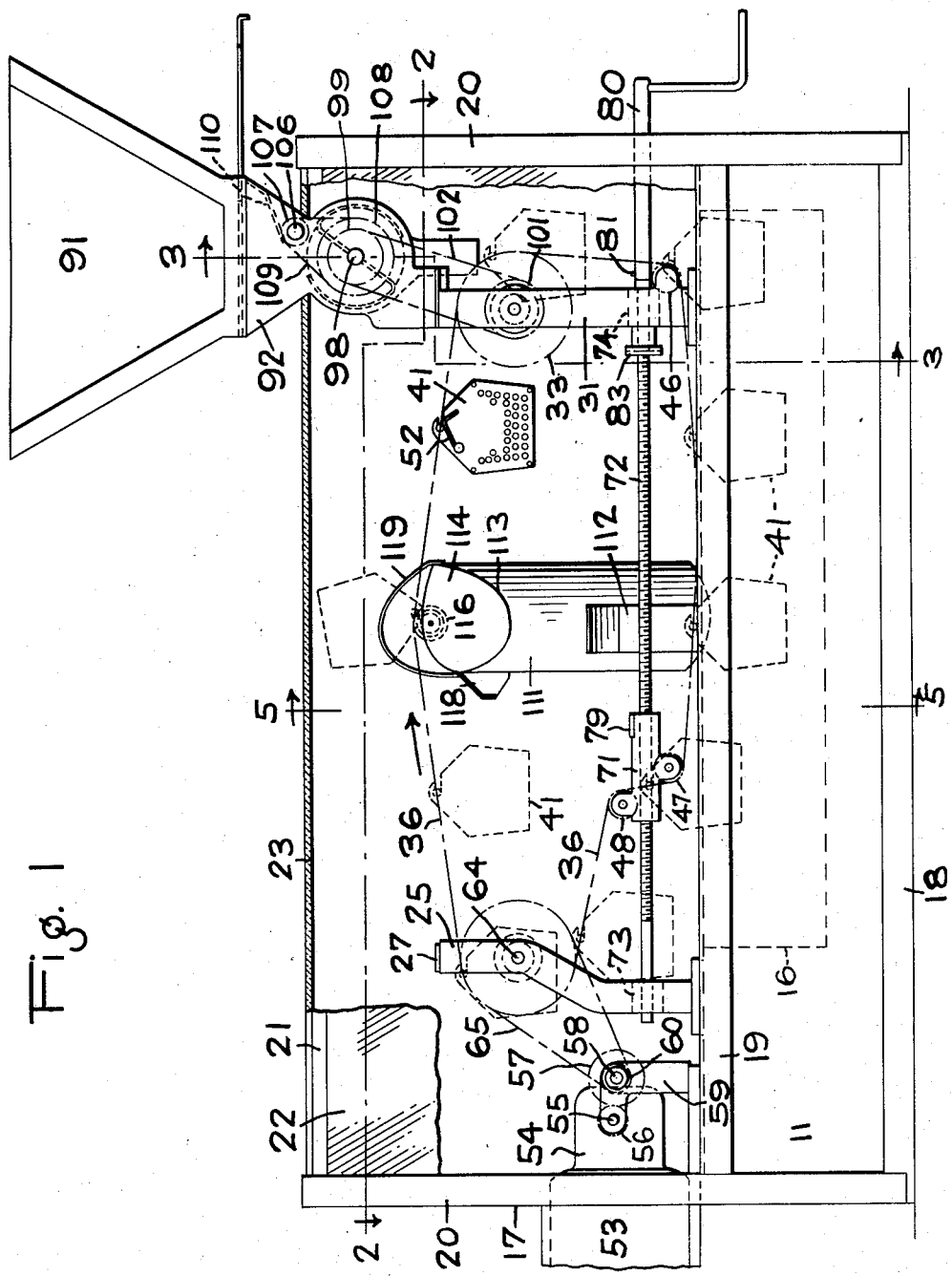
Figure 1 is a side elevation of a cooking device embodying the present invention, a portion of a side wall of the device being broken away to show the mechanism.

Referring to the drawings, the device comprises a base 11, having side walls 12, a bottom 13, end walls 14, and a top 15.

Figure 3:
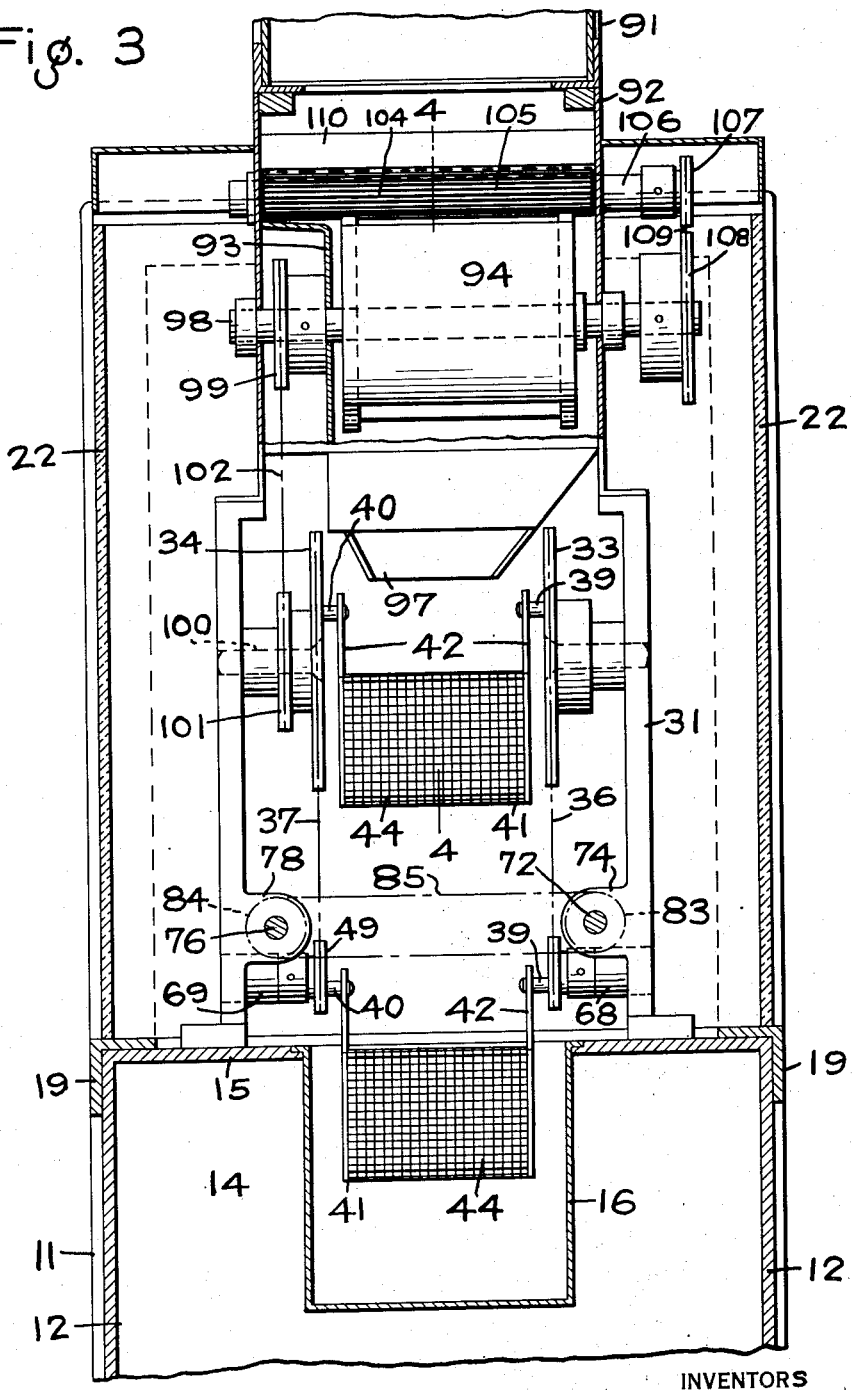
Fig. 3 is a vertical transverse section taken on the line 3—3 of Fig. 1.

Mounted within the base 11, and supported from the peripheral edge around an opening in the top 15, is a trough or pan 16 having all of its walls disposed in spaced relation to the walls and bottom of the base. The top of the trough or pan 16 is open and lies in substantially the same plane as the top 15, as shown in Fig. 3.

Figure 6:
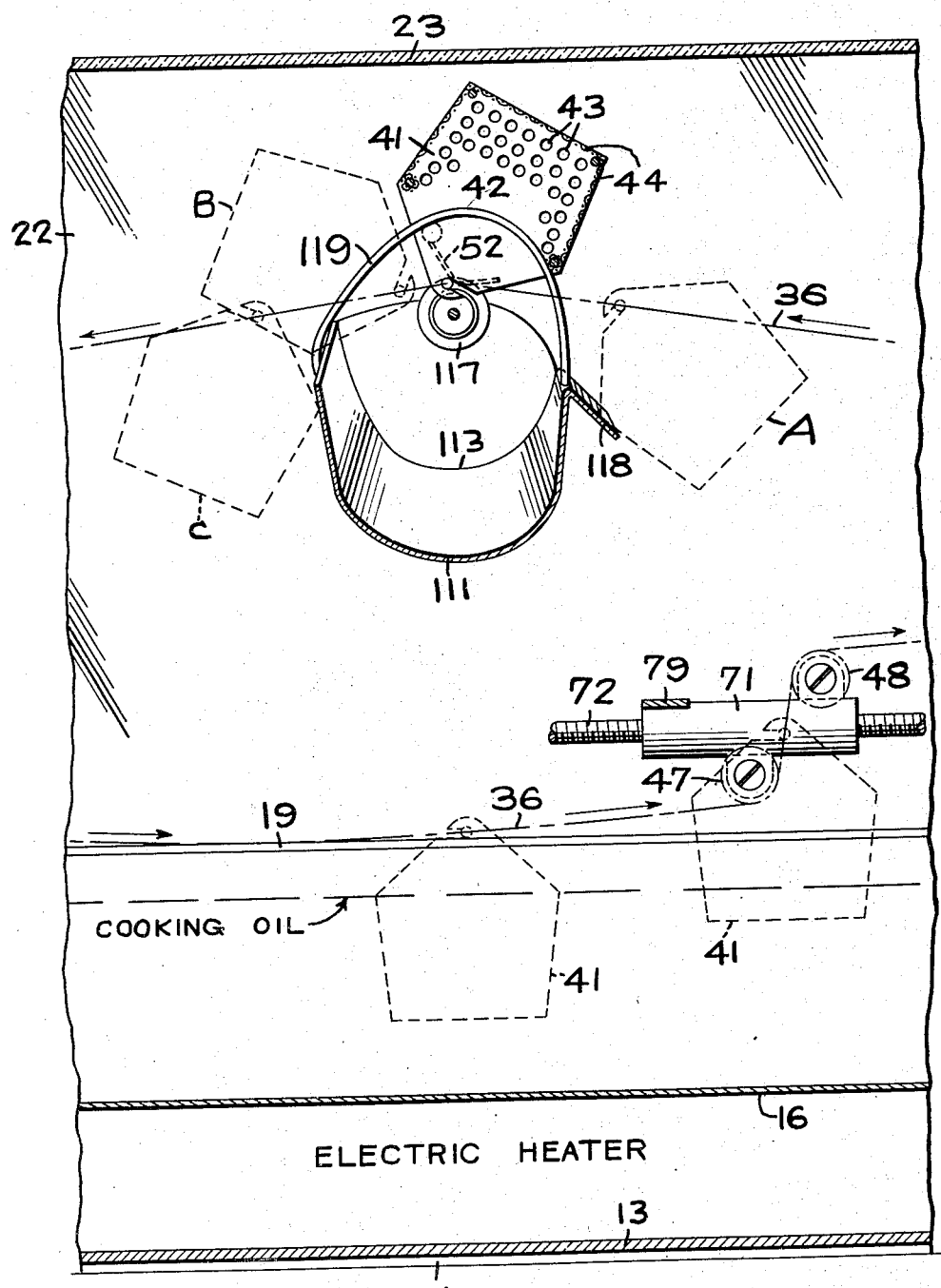
Fig. 6 is an enlarged vertical section taken on the line 6—6 of Fig. 5, showing the manner in which the baskets are operated in order to discharge the cooked food therefrom.

The pan 16 is adapted to contain a suitable quantity of cooking oil, grease, or like material, as indicated by the broken line in Fig. 6.

Disposed within the base 11 and surrounding the trough or pan 16 are suitable means for heating the cooking material. If so desired, electric heater elements (not shown) may be employed (see Fig. 6).

If so desired the base 11 may be mounted in a suitable skeleton frame 17 composed of lower horizontal angles 18, upper horizontal angles 19, and vertical corner angles 20 at the ends of the base.

Figure 2:
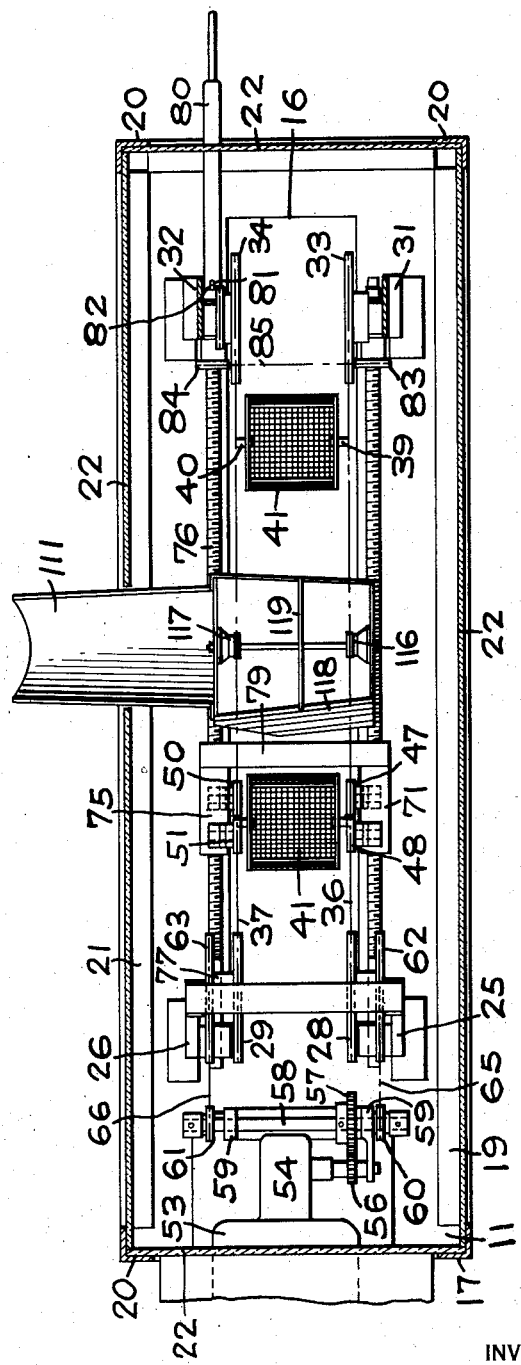
Fig. 2 is a horizontal section taken on the line 2—2 of Fig. 1.

The angles 20 may extend upwardly above the top of the base 11 a suitable distance and the upper extremities of said vertical angles may be connected by horizontal angles 21, so that the superstructure of the device may be enclosed by glass walls 22 and a glass top 23 supported by the angles, as shown in Figs. 1 and 2.

Mounted on the top 15 and disposed near one end of the base 11, is a pair of vertical standards 25 and 26 which are connected at the top by a cross bar 27 (see Figs. 1 and 2).

Journalled in suitable bearings carried by the standards 25 and 26, are sprocket wheels 28 and 29, respectively.

Mounted on the top 15 and disposed near the end of the base 11 opposite to the end on which the standards 25 and 26 are mounted, is a pair of vertical standards 31 and 32.

Journalled in suitable bearings carried by the standards 31 and 32, are sprocket wheels 33 and 34, respectively.

In order to convey the articles to be cooked through the circuit, endless conveyer belts or chains 36 and 37 are provided.

The chain 36 passes about the sprockets 28 and 33 and also passes about smaller sprockets 46, 47 and 48 to be hereinafter more fully referred to.

Figure 5:
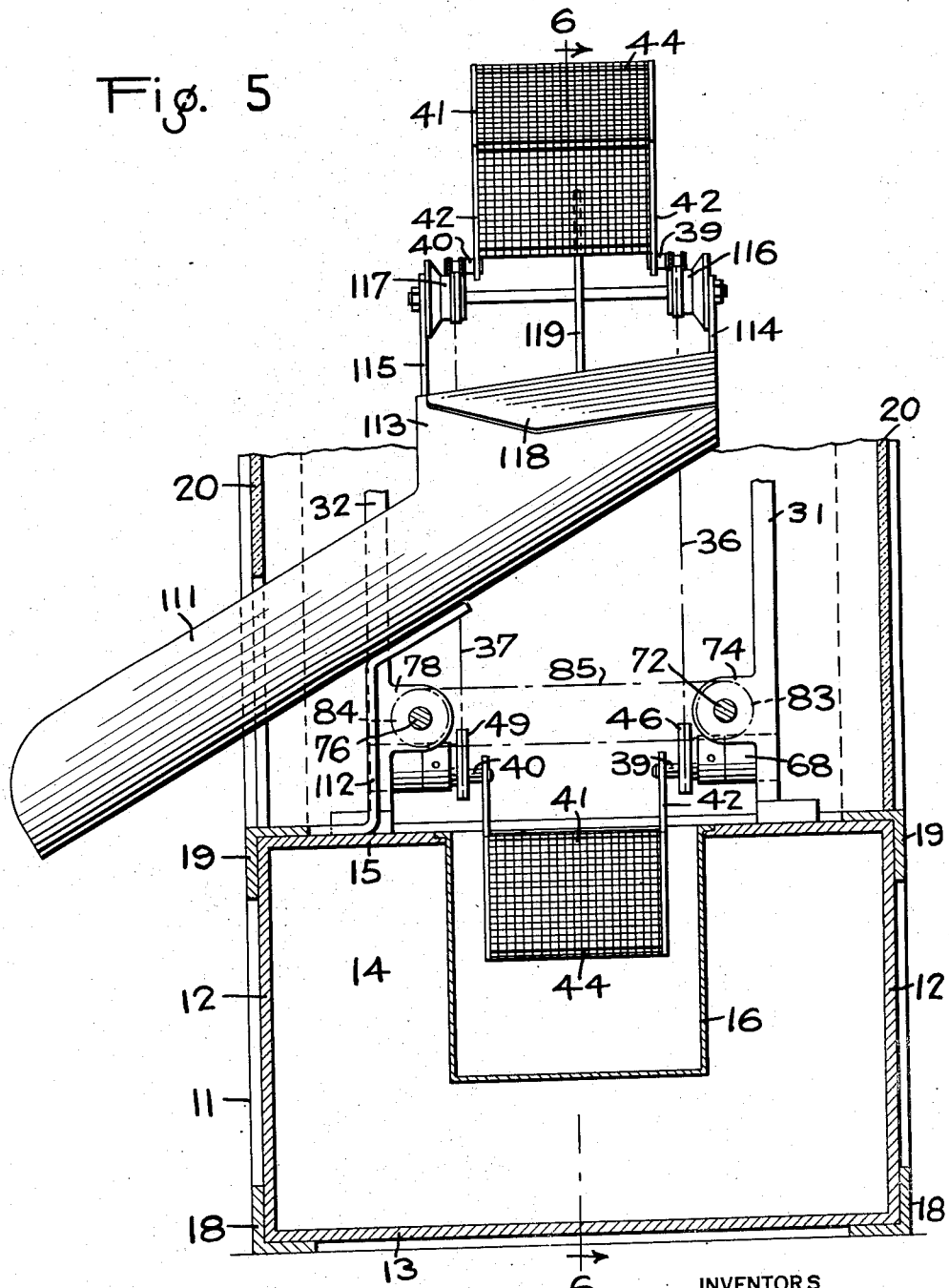
Fig. 5 is a vertical transverse section taken on the line 5—5 of Fig. 1.

The chain 37 is arranged in parallel relationship with the chain 36 and passes about the sprockets 29 and 34, and also about smaller sprockets 49, 50 and 51, as shown in Figs. 2, 3 and 5, and to be hereinafter more fully described.

At intervals the chains 36 and 37 are formed with diametrically disposed inwardly projecting pins 39 and 40, respectively, each pair of alined pins constituting means for supporting a basket 41.

The baskets 41 are uniformly spaced apart as indicated in Fig. 1. The baskets are disposed between the two chains 36 and 37 so that the baskets are free to swing, can be easily turned to an inverted position at the discharge station of the device whereby the cooked food will readily fall by gravity therefrom, and will at all other portions of the circuit, with the exception of the discharge station, remain in an upright position.

The baskets 41 may be constructed of any suitable foraminous material and may be of any shape. In the present case each basket is shown as having side walls 42 formed from sheet metal, said walls being perforated, as indicated at 43, so as to permit the cooking oil or grease to flow readily therethrough when the baskets descend and ascend from the cooking oil in the trough or pan 16. The end walls and bottom portion of each basket may be formed from suitable wire mesh fabric as indicated at 44. The top of each basket is open, and the side walls 42 may extend upwardly a suitable distance above the upper edges of the end walls, as shown in Figs. 3 and 5.

For the purpose of detachably mounting the baskets 41 on the chains 36 and 37, each side wall 42 is formed with a notch 45 (see Fig. 4), in which a pin 39, 40 is disposed. A spring 52 carried by each side wall 42 engages the pin and thereby retains the pin in its notch. When it is desired to remove a basket the springs 52 are depressed away from the pins 39, 40 thereby permitting the basket to be slid from the pins.

The chains 36 and 37 are operated from an electric motor 53 or other suitable power means. The motor 53 may have attached to the shaft thereof suitable speed reducing means contained in a casing 54. From such speed reducing means there is a shaft 55 on which is mounted a gear 56 which is in meshing relationship with a gear 57 on a shaft 58 journalled in suitable bearings mounted on standards 59 carried by the base 11.

Also mounted on the shaft 58 and keyed thereto is a pair of sprockets 60 and 61. These sprockets are in alinement with sprockets 62 and 63 mounted on the shafts 64 of the sprockets 33 and 34, respectively (see Fig. 1).

The sprocket 60 is operatively connected to the sprocket 62 by a chain 65, and the sprocket 61 is likewise connected to the sprocket 63 by a chain 66, as shown in Fig. 2.

The construction is such that the chains 36 and 37 are moved in the direction of the arrow, Fig. 1, at a slow rate of speed by the motor 53.

The sprockets 46 and 49 are journalled in suitable bearings 68 and 69, respectively, carried by the standards 31 and 32, as shown best in Fig. 3, said sprockets being located directly over one end of the trough 16 and at a considerable distance below the sprockets 33 and 34, so that after the baskets are loaded with raw food articles, the baskets will be carried downwardly into the cooking oil in the trough.

The sprockets 47 and 48 are rotatably supported on a carrier 71 which is mounted on a screw threaded shaft 72 disposed lengthwise of the machine and overlying one side of the trough 16. If so desired the shaft 72 may be journalled in bearings carried by the standards 25 and 31, respectively, as indicated by the broken lines 73 and 74, in Fig. 1 (see also Figs. 3 and 5).

The sprockets 50 and 51 are rotatably supported on a carrier 75 similar to the carrier 71, the carrier 75 being mounted on a screw threaded shaft 76 supported from the standards 26 and 32 by bearings 77 and 78, respectively, as shown in Figs. 2 and 3. The shaft 76 is disposed in parallel relationship with the shaft 72 and overlies the side portion of the trough 16.

The carriers 71 and 75 may be connected by a cross brace 79, as shown in Fig. 2.

As shown in Fig. 2, an end of the screw threaded shaft 76 is adapted to receive an end of a crank 80, said shaft having a pin 81 which is disposed in a slot 82 of the crank. When the crank 80 is turned, the shaft 76 will likewise be rotated and in order that the rotation of said shaft is also imparted to the shaft 72, the shafts 72 and 76 are operatively connected together by suitable means. In the instant case the shaft 72 has fixed thereon a sprocket 83 and the shaft 76 has fixed thereon a sprocket 84. An endless chain 85 is passed around the sprockets 83 and 84 as shown in Fig. 5. The construction is such that when the shaft 76 is turned in one direction, the shaft 72 will also be turned in the same direction and at the same speed, since both sprockets 83 and 84 are the same diameter.

The chains 36 and 37 pass under the sprockets 47 and 50 and over the sprockets 48 and 51, respectively, as shown best in Fig. 6. Since the sprockets 46, 49, and 47, 50, lie in substantially the same plane, which plane is directly above the top of the trough 16, the portions of the chains 36 and 37 which extend between said sprockets, are disposed directly above the trough 16 so that the baskets 41 will be suspended from the chains and will be disposed in the cooking oil in the trough, as shown in Fig. 1.

Since the trough is elongated, and since a definite interval of time is required for the food articles to remain in the cooking oil in the trough, in order to properly cook the food the desired amount, the interval of time by which the baskets remain immersed in the cooking oil can be regulated by moving the carriers 71 and 75 either forwardly or rearwardly of the trough in the manner heretofore described, by means of the crank.

After the carriers 71 and 75 have been properly positioned for a certain kind of food article to be cooked in the device, no further adjustments are required, and the cooking operation proceeds continuously.

For the purpose of loading each empty basket with a definite quantity of raw food, a feeder mechanism entirely automatic in operation is provided.

A suitable quantity of raw food is deposited in a hopper 91, of suitable dimensions. The hopper is mounted on top of the device, near the end in which the baskets are loaded.

Figure 4:
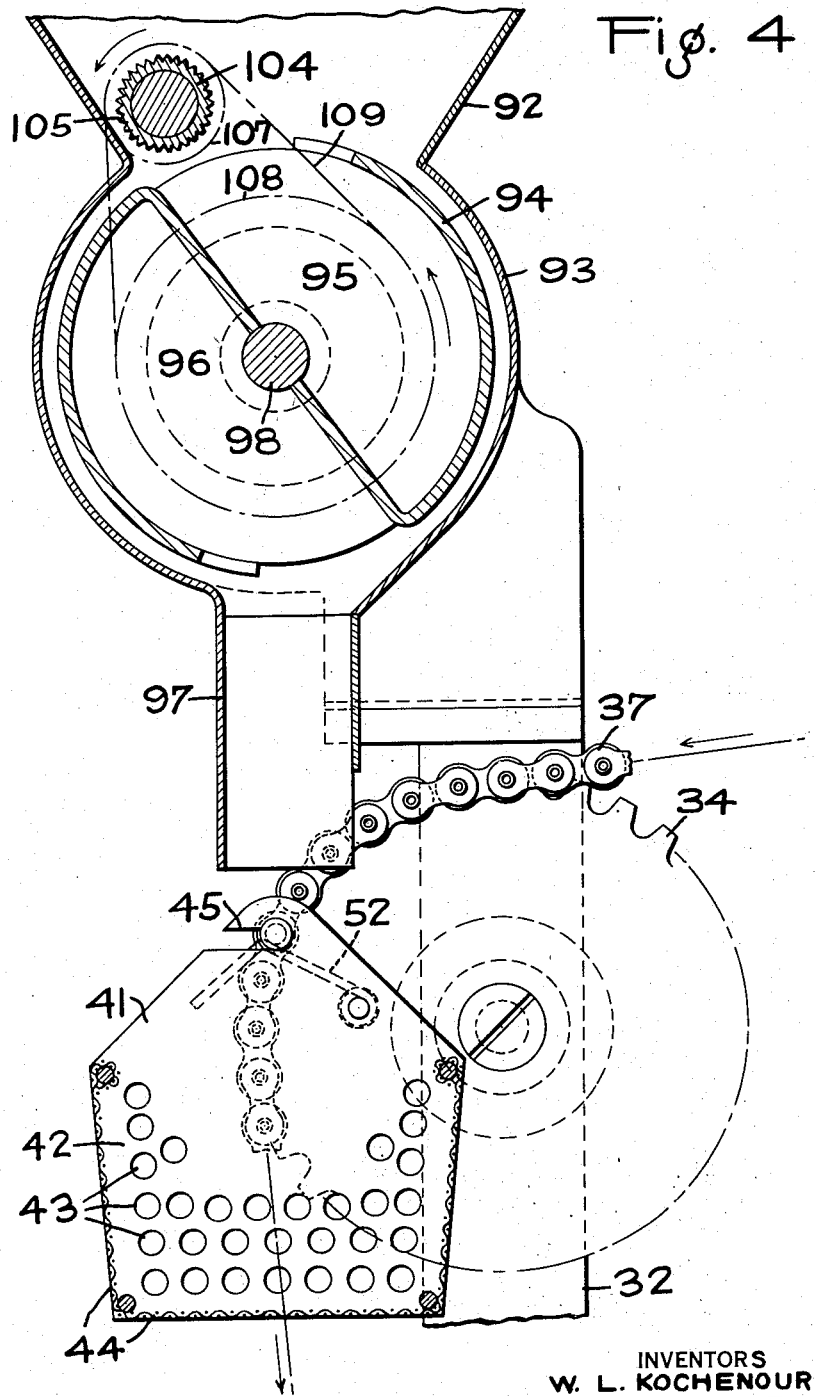
Fig. 4 is a vertical section taken on the line 4—4 of Fig. 3.

The bottom of the hopper 91 is formed with a contracted bottom portion 92 (see Fig. 4).

Below the portion 92 of the hopper there is a cylindrical chamber 93 in which is mounted a rotary valve gate 94. The valve gate in the present case is formed with two semi-cylindrical chambers 95 and 96, which chambers are adapted to be alternately filled with the raw articles of food from the hopper 91 and deliver such charges of food through an open end of the chamber to a chute 97. From the chute 97 the food articles fall by gravity into a basket 41 located directly beneath the bottom of the chute, as shown in Fig. 4.

The valve gate 94 has a shaft 98 on which is mounted a sprocket 99.

Mounted on the shaft 100 of the sprocket 34 heretofore referred to, is a sprocket 101 which is operatively connected to the sprocket 99 by means of a chain 102, as shown in Fig. 3.

The construction is such that when the sprocket 34 is rotating, during the operation of the device, the valve gate 94 will also be rotated at such a rate of speed that as each basket 41 passes slowly beneath the bottom of the chute 97, the open end of a chamber 95, 96 of the valve gate will be disposed in registration with the top of the chute so that the articles of food will discharge from the valve gate and be directed by the chute into the basket.

In order to prevent clogging of the food articles in the contracted throat 92 of the hopper 91, a roller 104 is mounted in said throat directly above the valve gate 94.

As shown in Fig. 4, the axis of the roller 104 is disposed at one side of a vertical line passing through the axis of the valve gate 94, so that said roller will not interfere with the normal flow of food articles from the hopper.

The exterior of the roller 104 is formed with teeth or serrations 105. These teeth are adapted to engage the food articles and agitate them in well known manner.

The roller 104 has a shaft 106 which extends through the casing of the feeder and on the end of which is mounted a sprocket 107. The sprocket 107 is connected to a sprocket 108 on the shaft 98 by a chain 109 so that said roller will be rotated in the same direction as the valve gate 94 is operated (see Figs. 3 and 4).

In order to prevent particles of the raw food from lodging in the space between the roller 104 and the adjacent wall of the hopper, a plate 110 is mounted in the hopper directly above the roller (see Figs. 1 and 3). This plate is not shown in Fig. 4.

For the purpose of discharging the cooked food from the device, a discharge chute 111 is provided.

The chute 111 has a main body portion which is mounted on a bracket 112 carried by the base 11, said main body portion being preferably inclined at an angle to the base of the device and being arcuate in cross section.

The upper inner end 113 of the chute 111 is located beneath the upper flights of the chains 36 and 37, and projecting upwardly from said inner end portion of the chute is a pair of standards 114 and 115 which support rollers 116 and 117, that guide the chains 36 and 37, respectively, in the manner shown best in Figs. 5 and 6.

The side of the chute 111 facing the oncoming baskets of cooked food is formed with a flange or lip 118.

As shown in Fig. 6, the lip 118 is angularly disposed so that when an oncoming basket approaches the chute 111 it will engage or strike against the lip 118 and thereby be tilted at an angle as indicated by the basket A.

Spanning the space between the side walls of the upper portion 113 of the chute 111, is an upwardly curved or arched track 119. This track may be formed from a suitable length of stiff wire, or it may be formed of any other suitable material.

The contour of the track 119 is such, that as a basket which has been tilted by the lip 118, rides over the lip, it will be gradually tilted further as it rides along the track 119, until at a point directly above the chute 111, the basket is inverted, as indicated by the full line position, shown in Fig. 6, so that the cooked food is discharged therefrom and falls into the chute 111.

During further movement of the basket along the track, the contour of the track is such that the basket gradually swings backwardly, as indicated by the dotted line positions B and C, Fig. 6, so that when the basket has traveled over the chute 111 and is at the side of the chute opposite to the side having the lip 118, the basket is again positioned with its bottom down.

From the chute 111 the empty baskets proceed to the position beneath the hopper 91 where they are loaded with uncooked or raw food in the manner heretofore described.

From the foregoing it will be noted that we have provided an improved cooking device which is continuous and automatic in its operation, and by which raw nuts, nut meats, and other articles of food may be thoroughly cooked in a sanitary manner. A box or other receptacle (not shown) may be positioned at the mouth of the chute 111 to receive the cooked food discharged from the machine.

Having thus described our invention, what we claim is:

1. A cooking device of the class described, comprising an elongated trough for the cooking fluid, an endless conveyor comprising two chains, the upper and lower runs of each chain being vertically spaced apart, means for operating said conveyor, diametrically disposed alined pins projecting inwardly from said chains at intervals throughout the length of the conveyor, a plurality of spaced apart baskets, each basket being disposed between a pair of alined pins, a notch formed in each side wall of each basket for receiving a pin, a spring member carried by each side wall of each basket to engage the pin to thereby detachably retain the pin in the notch, and means for guiding the conveyor so that said baskets have a path of movement into said trough, through said trough and out of said trough.

2. A cooking device comprising an elongated trough for the cooking fluid, an endless conveyor comprising two chains, the upper and lower runs of each chain being vertically spaced apart, means for operating said conveyor, diametrically disposed alined pins projecting inwardly from said chains at intervals throughout the length of the conveyor, a plurality of baskets, each basket being disposed between said two chains, a notch formed in the side of each basket for receiving a pin, means for retaining each pin within the notch and arranged to permit free swinging movement of the basket, means for guiding the conveyor whereby said baskets have a path of movement into said trough, through said trough and out of said trough, a feeder located adjacent one end of the trough and having a rotary valve gate comprising two semi-cylindrical chambers for delivering a predetermined quantity of raw food to each empty basket before the conveyor carries the basket into the cooking fluid, means operatively connecting said valve gate with said conveyor whereby the feeder will be continuously operated in synchronization with the conveyor, an inclined discharge chute located beneath the upper flight of baskets and arranged intermediate the ends of the device, said chute having a lip along one side in the path of the baskets approaching the chute, said lip being adapted to engage a basket and tilt the same at an angle as the basket moves over the lip, and an arched track spanning the space between the side walls of the chute and having a contour to cause the basket to swing upwardly to an inverted position when the basket is directly over the chute, the contour of said track being such that during further movement of the basket along the track the basket swings backwardly by gravity to its original position.

3. A cooking device of the type described comprising an elongated trough for the cooking fluid, means for heating the fluid in said trough, an endless conveyor comprising two chains, the upper and lower runs of each chain being vertically spaced apart, means for operating the conveyor at a substantially uniform rate of speed, said conveyor being arranged above the trough and substantially coextensive therewith, a plurality of spaced apart baskets, each basket having substantially vertical side walls, diametrically disposed alined pins projecting inwardly from said two chains at intervals throughout the length of the conveyor, alined notches formed in the side walls of said baskets for receiving said pins, a spring member carried by each side wall of a basket to engage said pin to thereby detachably retain the pin in the notch, and means for guiding the conveyor whereby said baskets have a path of movement into said trough, through said trough and out of said trough.

4. An automatic cooking device comprising a trough for the cooking fluid, an endless conveyor arranged above the trough and substantially coextensive therewith, a plurality of spaced apart baskets swingingly suspended from said conveyor for movement in one direction through the cooking fluid, means for driving the conveyor continuously at a substantially uniform speed, means for delivering a predetermined quantity of raw food into each basket before said basket enters the cooking fluid, an inclined discharge chute located beneath the upper flight of baskets and arranged intermediate the ends of the device, said chute having a lip along one side in the path of the baskets approaching the chute, said lip being adapted to engage a basket and tilt the same at an angle as the basket moves over the lip, and a track spanning the space between the side walls of the chute and having a contour to cause the tilted basket to swing upwardly to an inverted position when the basket is directly over the chute, the contour of said track being such that during further movement of the basket along the track the basket swings backwardly by gravity to its original position as the basket travels away from the chute.

WILLIAM L. KOCHENOUR.
HARRY W. WINEKA.